Feb. 18, 1958   B. WILSON   2,823,618
APPARATUS FOR PLASTERING
Filed Dec. 4, 1953   4 Sheets-Sheet 1

INVENTOR.
Broadus Wilson
BY
Elizabeth Newton Dew
Attorney.

Feb. 18, 1958 B. WILSON 2,823,618
APPARATUS FOR PLASTERING
Filed Dec. 4, 1953 4 Sheets-Sheet 2
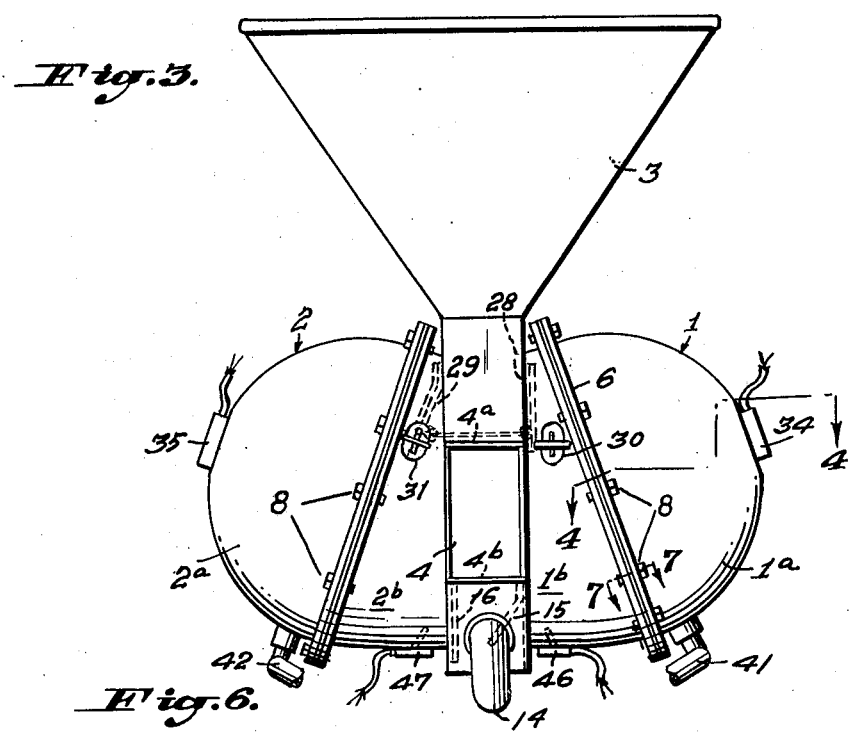
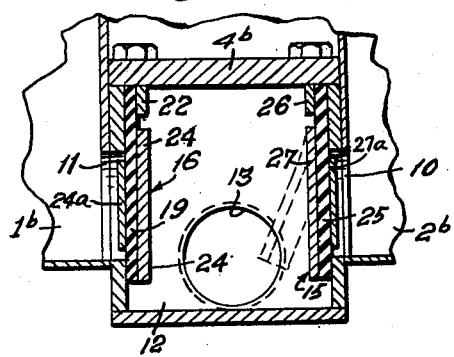
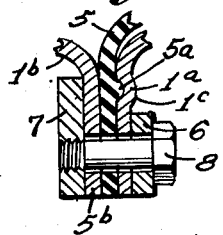
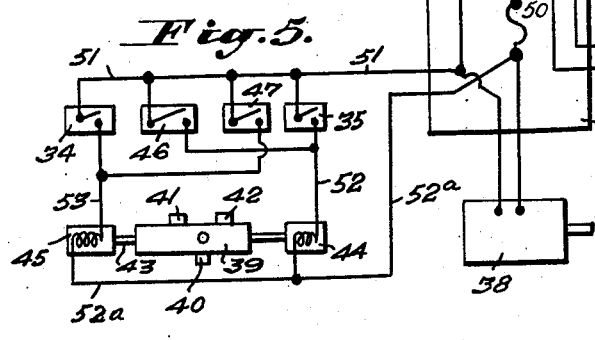
INVENTOR.
Broadus Wilson
BY Elizabeth Newton Dew
Attorney Feb. 18, 1958  B. WILSON  2,823,618
APPARATUS FOR PLASTERING
Filed Dec. 4, 1953  4 Sheets-Sheet 3
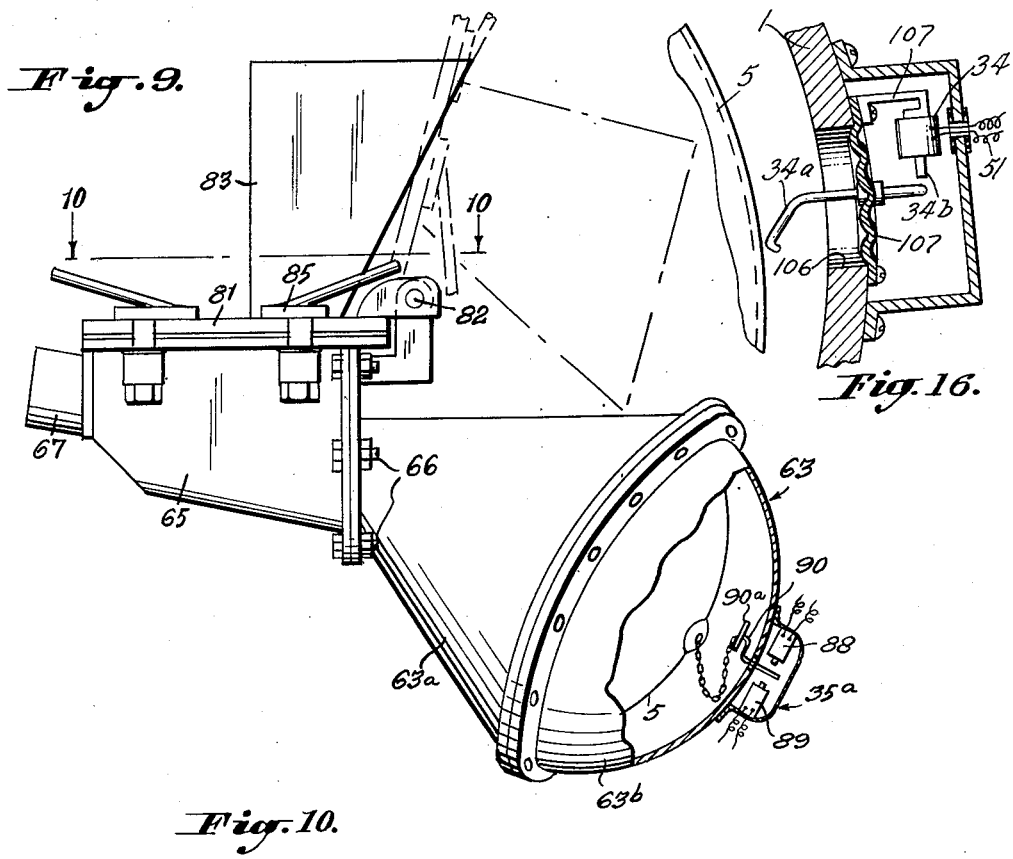
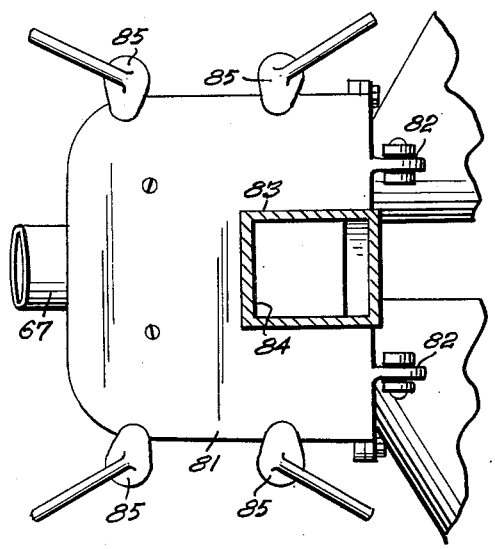
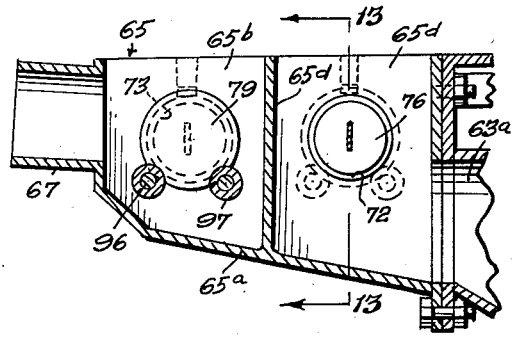
INVENTOR.
Broadus Wilson
BY
Elizabeth Newton Dew
Attorney.

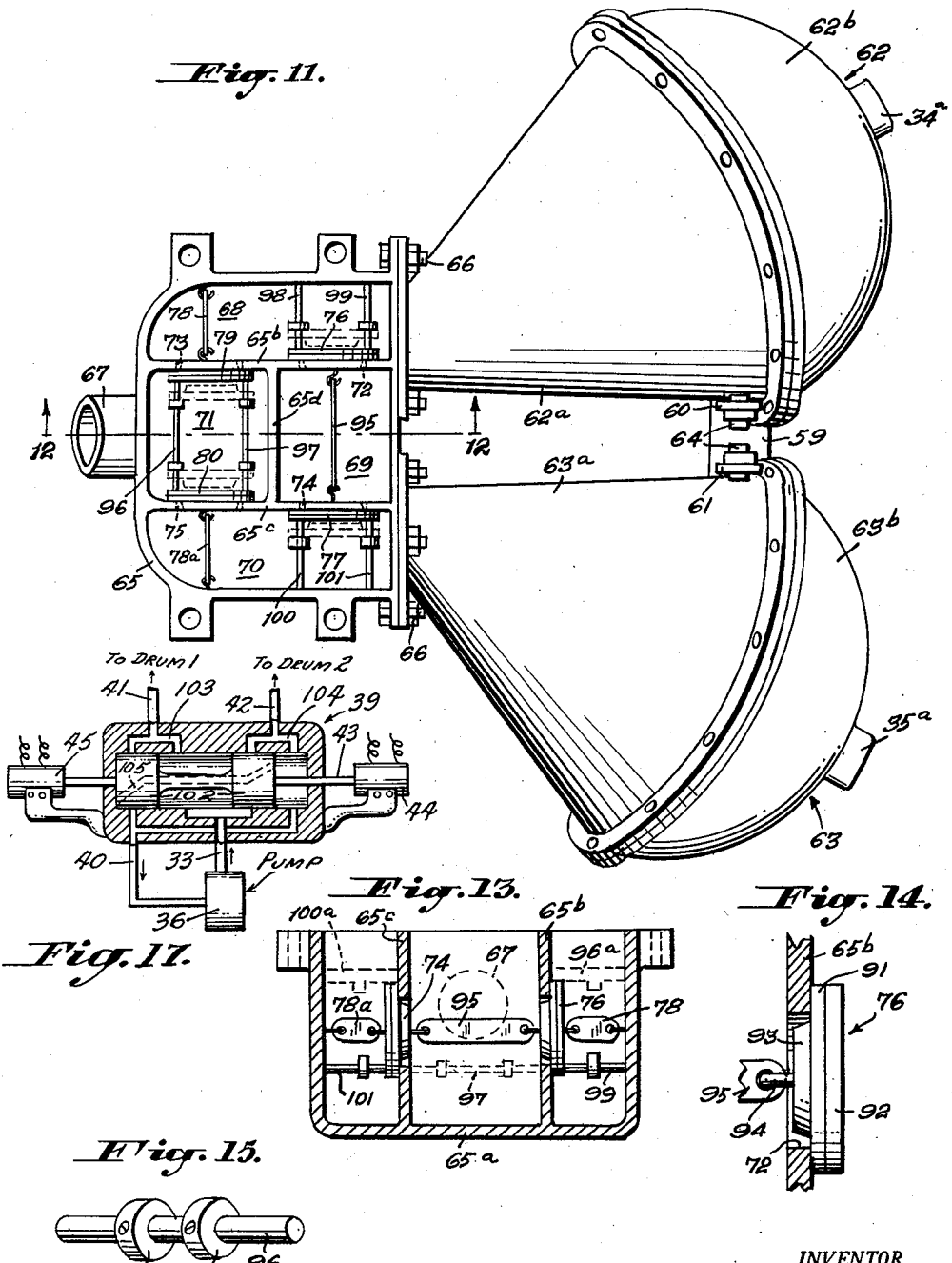

United States Patent Office 2,823,618
Patented Feb. 18, 1958

2,823,618

APPARATUS FOR PLASTERING

Broadus Wilson, Raleigh, N. C.; Margaret Wilson and Robert E. Long, executors of said Broadus Wilson, deceased Application December 4, 1953, Serial No. 396,132

4 Claims. (Cl. 103—150)

This invention relates to a method of and apparatus for the application of mortar to a supporting surface or area to be substantially uniformly covered thereby. By "mortar" is meant the usual aqueous mixture or paste of cement or lime and sand and which is either self-hardening or hardens in contact with air. For example, the most valuable of all mortars are those made with natural or Portland cements as a binding material, a proportion commonly used is one part cement to two or three parts of sand.

Prior to my invention, it has not been practicably possible to apply mortar in which sharp aggregate is used, by pressure or force feed, to walls, floors, ceilings and other supporting surfaces or areas because of the serious and unsolved difficulties involved. The usual cement mortar consists of a cementitious binder such as Portland cement or gypsum with aggregate and water in definite proportions. The aggregate used is customarily sand although crushed stone or other substance having clean, hard, strong durable uncoated grains may be used. Sand is preferred because its particles have sharp edges which interlock or interengage to form a dense hard surface of superior strength when dry, whereas aggregate consisting of smooth granules are not so firmly gripped by or embedded in the cementitious binder so that strength of the set mortar was reduced. It is well known that the tensile and compressive strengths of mortar vary greatly with size of the aggregates used. For example, with a 1:3 mortar wherein all of the aggregate passes a number 4 sieve, and 48% passes a number 100 sieve, the resulting mix has a tensile strength of about 149 p. s. i. and a compressive strength of about 490 p. s. i. at the end of ninety days, whereas a mortar of the same ratio in which only 5% passes a number 100 sieve has a tensile strength of 613 p. s. i. and a compressive strength of 5640 p. s. i. at the end of ninety days. In other words, a decrease of 43% in the number of particles passing a number 100 sieve increases the tensile strength over four times or 400% and the compressive strength over eleven times or 1100%, without however, any increase of the maximum size of the aggregate. By my invention an aggregate may be used which will give the maximum strength for each proportion of mix used.

When attempts were made to apply such mortar by means of a force pump, it was found that it was very difficult to maintain a uniform flow rate without adding so much water to the mix as to preclude its firm adherence to a single supporting surface such as a ceiling or vertical wall, while any conventional pump used for this purpose was necessarily very shortlived because of the grinding or scouring action of the sand or other preferred sharp aggregate passing under pressure in contact with the wearing surfaces of the pump.

Attempts have been made to apply such surfaces by forcing mixed dry sand and cement under air pressure to a nozzle and then mixing in water just prior to or upon emergence of the mixed solids from the nozzle. While it is possible to produce a satisfactory surface in this manner, the system is not practicable in building construction or where cost is a factor because of the necessarily great waste of material, amounting at times to as much as one-third of the solids used, and also because of the elaborate precautions necessary to avoid dust hazards.

It is accordingly an object of my invention to provide a process and apparatus for carrying the same into effect, which is cotinuous, rapid, safe and which affords a strong dense hard structure with a minimum of waste of materials.

In prior methods of application of mortar in building construction, it was necessary to employ a mix having a relatively high water content requiring wooden forms to hold the emplaced mix while setting. It is accordingly a further object of my invention to provide a method and apparatus wherein the water content of the emplaced mix is relatively low and is further reduced during application so that plaster and other mortar may be applied to floor, wall and ceiling surfaces without the use of wooden forms. As it is a well-known fact that water above an optimum percentage, increases the voids in the mortar and reduces its ultimate strength and density, it is a further object to provide a method and apparatus which for any proportion of cementitious material to aggregate, provides a structure which is equal or better than that provided by hand or trowel application or other prior art methods and devices.

Ancillary to the foregoing object, it is one purpose of my invention to afford a method and apparatus wherein a quantity of water in the mix is blown off or dissipated as the mix is sprayed or blown onto the surface or structure being covered so that the water content of the emplaced mix is satisfactorily low, while it may be pumped or forced to the applicator nozzle in a uniform stream, at practicable pressures.

A still further object of the invention is the provision of a method and apparatus which is in a very practical sense continuous and hence rapid and wherein the mortar is not at any time in grinding contact with the working surfaces of the pump so that economical, trouble-free operation is assured.

A further object is to provide an apparatus for carrying out the process described, which is relatively simple, and automatic and reliable in operation, easily serviced and repaired, with inexpensive parts.

Other objects and advantages of my method and apparatus will be obvious to those skilled in the art after a study of the following detailed description, in connection with the drawing.

In the drawing:

Figure 3 is an end elevation looking from the right in Figure 1.

Figure 4:
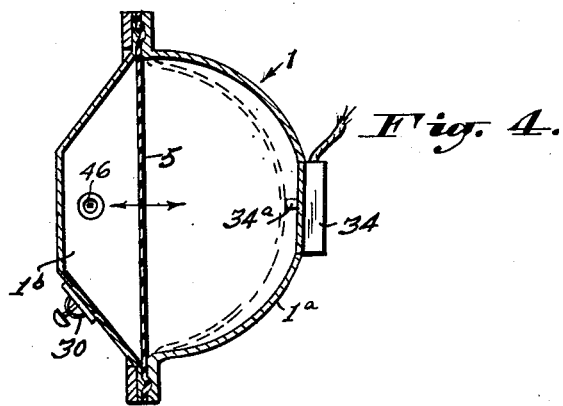

Figure 4 is a detail sectional view taken in a plane identified by line 4—4, Figure 3, and showing one of the two alternately acting drums by which plaster is forced to the nozzle, Figure 5 is a wiring diagram, Figure 6 is a detail view to an enlarged scale showing the flap valves by which plaster is admitted to the applicator hose, Figure 7 is a sectional detail view, to an enlarged scale taken on line 7—7, Figure 3 and showing the manner in which the flexible diaphragm is clamped between drum halves, Figure 8 is a detail view showing in side elevation one of the flap valve mountings, Figure 9 is a side elevation partly in section, of a preferred modification in operating position showing the valve box, one of the drums, the base portion of the hopper and, in dot-dash lines the tilted position of the hopper, Figure 10 is a section taken on line 10—10, Figure 9, and showing to an enlarged scale the pivoted base of the hopper also forming the cover of the valve box and the clamps for the cover, Figure 11 is a plan view of the preferred embodiment, with valve box cover and hopper removed to show the valve arrangement, Figure 12 is a section taken upon lines 12—12, Figure 11, Figure 13 is a section upon the line 13—13 of Figure 12, Figure 14 is a detail view of one of the plaster-control valves of the preferred form of the invention, Figure 15 is a perspective view of one of the valve guide rods, Figure 16 is a detail view, partly in section, showing a form of toggle switch associated with the drums and operated by substantially maximum distention of the respective diaphragms, and Figure 17 is a sectional detail view of the solenoid-operated valve by which the flow of pressure fluid between drums is reversed.

Referring in detail to the drawings, the machine is mounted upon a base or support B which may be in the nature of a wheeled truck or trailer, or may be mounted upon castors, or in any other way permitting it to be conveniently moved from job to job and into various positions in connection with each job.

Figure 1:
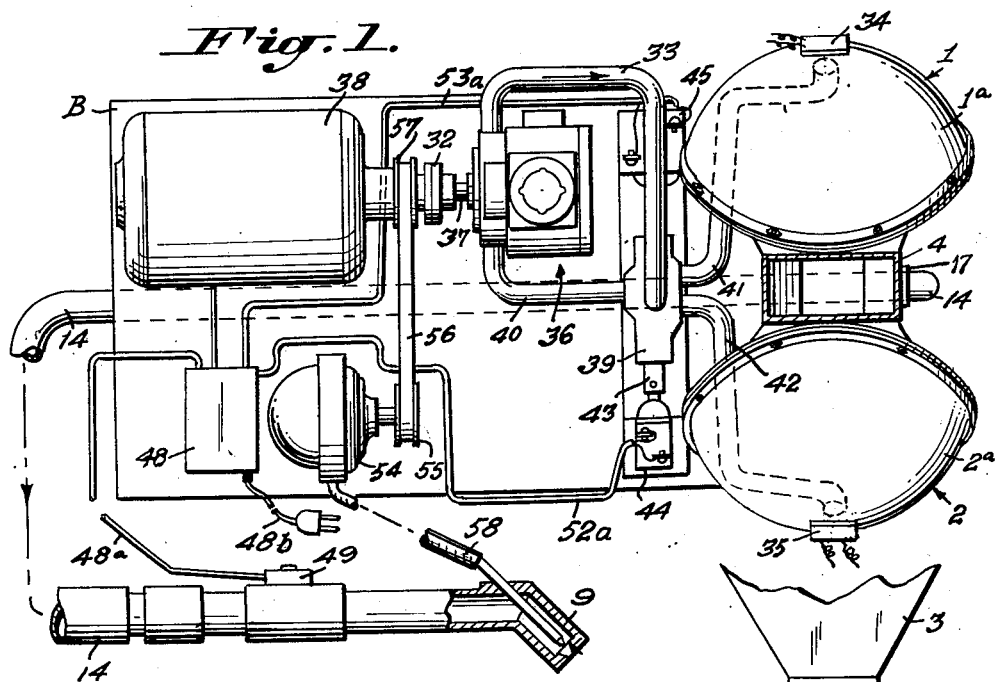
Figure 1 is a plan view of the machine with hopper removed for clarity of illustration.
Figure 2:
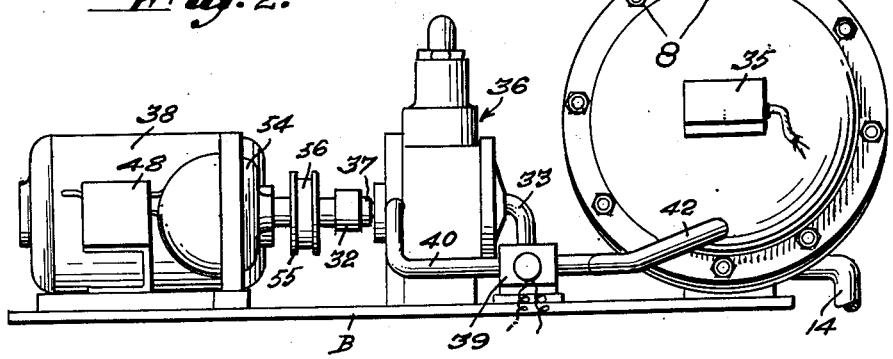
Figure 2 is an elevation of the lower side as the parts are positioned upon Figure 1.

A pair of drums generally identified at 1 and 2 are mounted upon base B, in side-by-side relation, Figures 1, 2 and 3. A hopper 3 may be of conventional inverted conical or pyramidal form and at its lower constricted end merges into and is in communication with, a valved frame 4 extending downwardly between drums. From Figure 3 it is noted that the frame has a length, that is, a dimension in vertical direction, a little greater than the diameter of a drum half. The dimensions of the frame in mutually normal horizontal directions are not critical. In Figures 1 and 3, the frame is shown as open in its central portion and of rectangular shape in cross section.

The two identical drums are formed in two halves such as 1a and 1b. Half 1a is a metallic shell generally hemispherical and flanged at its periphery to mate with the circular flange of half 1b. This half merges in a smooth uniform manner from its circular flange into a rectangular base coextensive with the contiguous side of frame 4, against which it is secured and fits. As indicated upon Figure 4, one flat surface of the drum abuts the contiguous face of the frame.

An elastic distortable diaphragm 5 of material such as "Neoprene," is of about the same circular size as the mating drum flanges and is clamped between them by through bolts extending through aligned holes in the two flanges and diaphragm at equally-spaced points. Referring in detail to Figure 7 showing a cross section through the flanged joint it will be noted that the flanges of halves 1a and 1b are clamped between two metallic rings 6 and 7, with diaphragm 5 between them and that a series of cap screws 8 pass through ring 6 and the flanges of the drum halves, with a smooth fit and are threaded into holes in ring 7 to thereby form a pressure-tight seal with the diaphragm dividing its drum into two chambers of reciprocally variable volume. A circular bead 5a is shown formed integrally about the rim of diaphragm 5 and is pressed by the overlying flange portion of half 1b and ring 7, into a circular channel 1c formed in the flange of half 1a. It will be noted that ring 7 is wider than ring 6 for this purpose. The diaphragm is thus firmly clamped at its periphery between drum halves and, due to its elasticity, can be expanded in either direction into substantial conformance with the walls of the halves. It is contemplated that the diaphragm will vary from a minimum thickness of, say 3/16" at its periphery, to 3/8" at its center where the stretch is greatest.

The outer halves of drums 1 and 2, that is, the hemispherical portions, form two outer chambers in connection with the respective diaphragms. These chambers contain pressure fluid or liquid, such as oil, and their volumes are reciprocally varied by a volume of liquid extracted from one chamber and forced under pressure into the other by means subsequently described. The inner chambers, that is, the ones formed by drum halves 1b and 2b, the respective diaphragms 5 and the contiguous sides of frame 4 receive plaster or other material from hopper 3 and are alternatively expanded and contracted in volume by the diaphragm, each in reciprocal relation with its related pressure fluid chamber.

The frame 4 has, a generally horizontal partition 4a, Figure 3, forming the bottom of the hopper. Openings place the bottom of the hopper thus formed in communication with the respective drum halves 1b and 2b through which plaster is drawn from hopper 3. Each of these openings is closed by a one-way valve 28 or 29, which may be a flap valve, subsequently described, so arranged that the return flow of plaster to the hopper is prevented. The lower part of the frame 4 has a second partition 4b which, with the contiguous sides and bottom of the frame, forms a pressure tight chamber 12 into which plaster is forced from the drums, on its way to the applicator nozzle 9, Figure 1.

As best shown in Figure 6, openings 10 and 11 extend from pressure chamber 12 to the respective drum halves 1b and 2b. An opening 13 which may be provided with a threaded connection 17 for a hose 14 leads to nozzle 9, Figure 1, and is adapted to conduct plaster thereto under pressure.

The openings 10 and 11 are each provided with one-way valves shown as flap valves which permit the exit of plaster from the respective drum halves 1b and 2b into pressure chamber 12 but which prevent the return flow of plaster to the drum.

Thus referring to Figure 6 the valve for opening 10 is identified generally by the numeral 15 while that for opening 11 is identified at 16. Since these two valves are duplicates and similarly mounted a description of valve 16 will suffice. Referring then to Figure 6, a thick sheet of pure rubber or other flexible material 19 has a rounded lower end and is suspended from its straight upper edge by a pair of spaced brackets 20 one of which is shown in Figure 8. As will appear from this figure, a reenforcing strip 22 of metal is secured to and along the upper edge of the rubber sheet 19 by any suitable means such as rivets or rubber cement.

The strip 22 projects beyond the sheet 19 at each side edge thereof and each projecting end is pivotally supported by a respective bracket such as 20 while the sheet itself extends loosely between the brackets. A circular reenforcing metallic plate 24 is secured to the lower portion of sheet 19 such that its lower half is coextensive with the lower half of the sheet and in a manner obvious from this figure so that the plate is positioned substantially coaxial of its opening 11 and is of materially larger diameter than the opening. The plate 24 is bonded to the rubber of elastic sheet 19 and may be riveted or bolted to a smaller round metallic plate 24a positioned upon the other side of the sheet so that it cannot be forced through its opening under pressure. From Figure 8 it will be noted that the brackets such as 20 are open at the top so that each valve may be lifted off its brackets for repair or replacement. The other valve generally identified at 15 and closing opening 10 to drum half 2b is constructed and mounted in a manner similar to that just described for valve 16 so that referring to Figure 6 it is sufficient to identify rubber sheet 25, mounting strip 26, and circular plates 27 and 27a. Figure 6 shows in dotted lines the approximate position to which the valve 15 is pivoted when plaster is flowing from drum half 2b into chamber 12.

The upper flap valves which permit the passage of plaster from the hopper 3 into the respective drum halves are identified generally at 28 and 29, Figure 3, and since they may be identical in construction and mounting with valves 15 and 16, it is unnessary to describe them in detail. The only difference is, of course, that these valves are mounted on the outer walls of the base or frame 4 so that they open to permit the drawing of plaster into the respective drum halves. Hand holes and quick detachable covers of conventional form are provided in the walls of drum halves 1b and 2b as indicated generally at 30 and 31, Figure 3, in positions to permit easy inspection, adjustment and replacement, if desired, of the valves and for access in cleaning.

A body of oil or other suitable liquid, having a total volume about equal to the total volume of one of the drums 1 or 2, is automatically pumped back and forth between drums to alternately expand one inner chamber and draw plaster thereinto, while contracting the other and forcing plaster under pressure therefrom to the applicator nozzle. In the machine disclosed, this function is performed by a pump which is of the variable delivery type such as the sliding vane or variable-stroke piston type. Such pumps are well known and, per se, form no part of the invention. A suitable pump of the sliding vane type is identified at 36, Figures 1 and 2, and consists of a rotor whose shaft 37 is directly coupled to 32 to the aligned shaft of electric motor 38 shown upon Figures 1 and 2 as mounted on base B. As is well known, this pump has a cylindrical cage within which the vaned rotor rotates with its vanes in sliding contact therewith, and so mounted that the cage can be moved from a no-delivery position wherein the axes of the rotor and cage are coincident, to positions wherein the delivery is increased by a successively-increasing separation or eccentricity of the cage axis relatively to the rotor axis. In the pump shown, the eccentricity and hence rate of delivery of the pump is controlled by a spring whose tension can be manually adjusted for desired working or delivery pressure and which acts upon a piston in turn engaging the cage. The connections are such that the delivery pressure of the pump acts upon the aforesaid piston against the force of the spring. Consequently, when the delivery pressure drops the spring is free to move the cage to increase the pump delivery. As delivery pressure builds up the pressure moves the cage against the force of the spring to decrease the eccentricity of the cage and rotor with a consequent decrease in stroke of the vanes and delivery of the pump. Equilibrium is established when the delivery pressure is balanced by the spring as manually pre-adjusted.

The delivery pipe leading from the pump is identified at 33 and extends to a solenoid-operated valve 39 which may be of the balanced-piston type as disclosed in Figure 17.

Referring to this figure it will be noted that valve 39 is of the sliding vane or spool type and that the intake of the pump is connected by pipe 40 with two ducts in the valve body leading to the respective ends of the valve chamber in which spool 102 is slidable a short distance. Pipe section 41 leads from passageways 103 in the valve body to drum 1 while pipe section 42 leads from passageways 104 in the valve body to drum 2. When solenoid 45 is energized, the spool 102 is moved to the position shown upon the figures wherein, as will be apparent from inspection, operation of the pump extracts fluid from drum 2 and forces it into drum 1. On the other hand, when solenoid 44 is energized the spool 102 is moved to its right hand limiting position as viewed upon the figure, whereupon in an equally obvious manner, fluid is drawn from drum 1 and forced into drum 2. A passageway 105 drilled between the two ends of the spool balances the pressure at the two ends and permits axial movement of the spool with a minimum force.

Drum 1 has a switch 34 positioned as shown upon Figures 1, 3 and 4. This switch which is normally open, may be as shown at Figure 16 wherein an actuator or toggle 34a projecting into the drum, which is engaged and actuated, to close the switch when the diaphragm 5 is distended to about the position shown in dashed lines upon Figure 4 and in solid lines upon Figure 16. Thus, from the figure it will be noted that the wall of drum 1 has a circular aperture 106 covered by a corrugated diaphragm 107 secured thereto to make a pressure-tight seal. Actuator 34a is affixed to and extends through the diaphragm and at the exterior of the drum has its end closely adjacent the toggle 34b of the switch which is normally open and rigidly mounted to the drum by bracket 107. As the diaphragm 5 moves into fully distended position, the actuator 34a is engaged thereby, slightly pivoted and thus effects closure of the circuit to energize corresponding solenoid 45. Likewise drum 2 has a like switch 35 similarly positioned and which is closed in response to distention of its diaphragm to a position corresponding to that shown in dashed lines upon Figure 4, that is, a position in which it is substantially full of plaster. As a safety feature, second switches 46 and 47, Figure 3, are mounted on the drums 1 and 2, respectively, in positions at the bottom of halves 1b and 2b. Thus each of these switches which are normally open, is closed when its respective diaphragm is substantially fully distended in a direction opposite to that shown in dotted lines upon Figure 4. Switches 46 and 47 may be generally of the same construction as 34 and 35, but their springs must be sufficiently strong to resist closure by gobs of plaster falling upon their toggles.

The complete wiring diagram is shown on Figure 5 wherein are shown motor 38, valve 39 and switches 34, 35, 46 and 47. At 48 is indicated a fuse and relay box and at 49 a control switch which, at Figure 1, is shown as mounted for convenient actuation by the operator holding nozzle 9. When this switch is closed, current flows from a source of voltage (not shown) over cable 50b, to a fuse and relay box 48 which is shown upon Figure 1 as mounted on base B. From this box a cable 48a extends to a control switch 49. The branch parallel circuit through switch 49 includes the coil 50a of a relay 50, so that the circuits to motor 38, switches 34, 35, 46 and 47 and solenoids 44 and 45 are all open when switch 49 is open. The machine is thus placed under the complete control of the operator. From relay contacts 50, lead 51 extends to each of the drum switches 34, 35, 46 and 47. From switch 35 a lead 52 extends to solenoid 44 of valve 39 and thence by leads 52a to the other side of the line. Lead 51 extends to switch 34 and thence by lead 53 to solenoid 45 of valve 39, and by return 52a to the other side of the line. It will be noted that leads 51 and 52 are connected by parallel connectors including switches 35 and 46, respectively. Likewise leads 51 and 53 are connected by parallel connectors including switches 34 and 47, respectively. Consequently valve solenoid 44 will be energized by closure of either of switches 35 or 46, while solenoid 45 will be energized by closure of either of switches 34 or 47.

In Figures 1 and 2 an air compressor 54 is shown mounted on base 3 with a pulley 55 driven by belt 56 from a pulley 57 on the shaft of motor 38. This compressor supplies compressed air over hose 58 to nozzle 9, as described in my previously identified application.

In operation, assume that hopper 3 is full of plaster, and that by previous manipulation, drum 1 is substantially full of plaster so that its diaphragm corresponds generally with the dotted line position of Figure 4, while drum 2 is full of oil. The valve 39 at this time will be in the position to which it is moved by energization of solenoid 45, so that pump 36 will draw fluid from drum 2 and force it into drum 1. The operator grasps nozzle 9 for applying plaster to the desired surface or area and closes switch 49. In a manner obvious from Figure 5, this starts motor 38 and drives pump 36 and compressor 54. As oil is drawn from drum 2, a suction is created which, aided by the pressure head of the plaster in hopper 3, causes the plaster to flow past flap valve 29 into drum half 2b.

As fluid is forced into drum 1, its diaphragm is moved and the plaster therein is placed under pressure, thus causing the flap valve 28 in this drum to close and forcing plaster out through valve 15 to hose 14 and nozzle 9. This pressure will be sufficient to cause the valve 16 to seat and close passage to drum 2 so that all plaster is forced out to the nozzle, where it is applied in the form of a spray by compressed air from hose 58. See Figure 1. This operation continues until drum 2 has been substantially exhausted of fluid and is filled with plaster, thus causing its diaphragm to engage and close switch 35 and energize solenoid 44. Or, of course, it may be that diaphragm 5 first contacts and closes switch 46 as drum 1 becomes substantially filled with fluid. In either event, valve 39 is actuated, as before, and reverses the flow of fluid between drums thus causing the plaster now filling drum 2 to be forced therefrom through nozzle 9 and simultaneously drawing plaster from the hopper into drum 1.

At the instant either of the switches 34, 47, 35 and 46 is closed, there is a vacuum in the corresponding drum due to the withdrawal of fluid therefrom. Consequently, were a constant delivery pump used, an appreciable time would elapse between closing of one of the switches, reversal of the valve and pick-up to operating pressure in the drum full of plaster. This particularly is true since plaster is compressible. In my machine, at the time of switch-over, the delivery side of the pump is instantaneously connected to the outer chamber of the drum full of plaster which, as previously explained, is under vacuum. The aforementioned pressure control spring in the pump, being no longer balanced by delivery pressure of the pump, causes the pump cage to shift to the maximum eccentricity or delivery position so that there is an instantaneous increase in delivery of the pump to substantially maximum. The result is a very rapid increase of hydraulic pressure in the fluid chamber of the drum full of plaster so that switch-over between drums is practically instantaneous with the result of a constant even flow of plaster from the nozzle.

As the only parts in wearing contact with the mortar are the flexible diaphragm and flap valves, all of which are relatively inexpensive and easy to replace, the machine is long-lived, free from delays incident to breakdowns and easily serviced and repaired.

In the form of the apparatus as shown in Figures 1 through 8 it is desirable to provide a vacuum-pressure valve (not shown) at the highest point on the hydraulic fluid side of each drum. For example, such valve would be located at the top of drum half 1a, and another at the top of drum half 2a, as the parts are viewed in Figure 3. These valves, which are of a well-known type, prevent the entrance of air on the vacuum stroke, that is, the stroke wherein the respective outer or hydraulic chambers are being evacuated of hydraulic fluid, and will let out air on the pressure stroke without, however, losing oil. Thus, any air which leaks in on the vacuum stroke will be forced out of the hydraulic fluid chambers when they are placed under positive or gage pressure.

Referring in detail to Figures 9 to 13, a second and preferred form of the invention consists in a base or support not shown, to which a bracket 59, Figure 11, is secured by welding, bolts or rivets and having axially-spaced upstanding lugs bored to align with correspondingly bored lugs 60 and 61 fixed to the base or conical members 62a and 63a of drums 62 and 63. Pivot pins extend through the aligned bores, whereby the drums and valve box may be pivoted as a unit from the operating position shown at Figure 9, counterclockwise to a position wherein the halves 62a and 63a are tilted to a clean-out position wherein flushing water and plaster may drain therefrom by gravity. As shown the outer or hydraulic fluid halves 62b and 63b of the drums are hemispherical and have flanges which mate with and are rigidly bolted to the respective halves 62a and 63a with a flexible diaphragm therebetween, as in the previously-described species. The hydraulic fluid halves are provided with respective switches 34a and 35a whose construction will be subsequently described.

A rigid valve box 65 which may be of cast steel is generally of parallelepipedal form and has a substantially vertical side or face with openings to align with the flanged openings, respectively of drum halves 62a and 63a. Bolts 66, Figures 9 and 11 secure the drum halves to the box in a rigid, pressure-tight joint.

Referring to Figures 9 and 12 it will be noted that the valve box has a generally sloping bottom 65a which terminates at the side opposite the side to which the drums are connected, in a hose coupling 67 to which a flexible hose such as 14, Figure 1, may be connected. A pair of parallel upright partitions 65b and 65c, Fig. 11, extend between the front and rear faces of the box. Furthermore, a central upright partition 65d connects the mid-portions of the partitions 65b and 65c. All partitions are integrally connected with the box walls and bottom and have their top edges substantially coplanar with the top of the box walls.

In conjunction with the box walls and bottom, the partitions thus define four chambers or compartments identified respectively by the numerals 68, 69, 70 and 71. Valve ports all shown as round and preferably of the same diameter are formed in the partitions for controlled flow of plaster in the manner subsequently described.

Thus, partition 65b has a port 72 between compartments 69 and 68 and another 73, between compartments 68 and 71. Similarly, partition 65c has a valve port 74 between compartments 69 and 70 and another 75 between compartments 70 and 71.

Passage of plaster through the ports just described is controlled by four valves all of which may be duplicates so that a description of one will suffice. Thus referring to Figure 14, a round flat pad 91 of resilient material such as pure gum rubber and of larger diameter than valve opening 72 is bonded to a correspondingly-shaped metallic plate 92. A round reinforcing plate 93 is secured centrally to, and of smaller diameter than plate 92 to have a loose fit within valve opening 72. A hook 94 may conveniently secure plates 92 and 93 together and also afford means for detachably connecting an elastic or resilient closure member 95, which, as shown upon Figure 11, has its other end attached in a like manner, to valve 77. As the other three valves are shown as duplicates of valve 76, it is sufficient to identify valves 77, 79 and 80 for openings 74, 73 and 75, respectively. However, it should be noted that valves 76 and 77 are so disposed as to permit flow only from compartment 69 to compartment 68 or 70, while valves 79 and 80 permit flow only from compartments 68 or 70 to compartment 71. Thus elastic cords or springs 78 and 78a are secured at one end to valves 79 and 80, respectively, and at their other ends to the wall of the valve box, whereby these valves are yieldingly urged to closed position.

Means in the form of cages are provided to guide the valves in substantial translation only, when opening and closing. Each cage may consist of three parallel rods or guides spaced equiangularly about the center of each valve with one rod or guide at the top. The guides are so positioned as to contain and guide the valve in opening and closing movement and also to limit the extent of opening to a maximum about equal to the area of the ports. In the case of valves 79 and 80, the valve cage consists of a pair of rods 96 and 97, Figures 11, 12 and 13 each secured at its ends in a hole in the partitions 65b and 65c. Each rod has an angular position about the axis of the valves about as shown in Figure 12 and each has a central enlargement or collar such as 96a, Figure 15, to abut the valves when open and limit their movement. The third rod or guide is attached rigidly to the top or cover of the valve box and is therefore shown in dotted lines upon Figure 12. Like guides 96 and 97 it has correspondingly positioned shoulders or abutments so that all three of the abutments for each valve lie in a single plane normal to the central axis of the valves. In the case of valve 76, the cage consists of a pair of rods 98 and 99 having the same angular relation to the valves as for rods 96 and 97, Figure 12, and each having a stop shoulder or collar properly positioned axially of the rod to stop the valve in desired maximum opening. As in the case of valves 79 and 80, the top guide is affixed to the cover and is thus indicated in dotted lines at 96a, Figure 13. The cage for valve 74 is identical with that just described for valve 76 so that referring to Figures 11 and 13, it is sufficient to identify rods 100 and 101 and top guide 100a in dotted lines. As indicated upon Figure 15, the collars may be adjustably fixed on the rods to vary the permissible maximum openings of the valves.

As the top guides are all attached to the hinged cover, they open therewith and thus expose all four valves to inspection, adjustment and easy removal and replacement. In case adjustable stops are used on rods 96 and 97, the corresponding stops carried by the cover will be likewise adjustable. Thus in a manner subsequently described, on the suction or intake stroke mortar passes downwardly under gravity and suction through the base of the hopper 83, rigidly attached to cover 81, to compartment 69 and, alternately through valves 76 and 77 to compartments 68 and 70 and drum halves 62a and 63a. On the pressure strokes mortar is forced alternately from the drum halves and compartments 68 and 70, through valves 79 and 80 to compartment 71 and the hose coupling 67. The open positions of the valves are indicated in dotted lines on Figure 11.

From Figures 9 and 12 it is noted that the top of the valve box and all partitions therein are made substantially coplanar as by machining. A cover 81 for the box has a flat under surface and is hinged at 82 to brackets which extend outwardly and upwardly from the rear face of the box. The hinge pin openings are slightly elongated in the vertical direction to permit a limited movement of the cover to assure a uniform pressure tight joint between the upper edges of the box and its partitions. Figures 9 and 10 show that the cover 81 is integral with and forms the base and support of the hopper 83 and has an opening 84 whereby mortar may flow from the hopper into compartment 69. Suitable cam type clamps 85 are pivoted in lugs spaced at intervals about the periphery of the box and are so constructed and arranged that when pivoted to the positions shown upon Figure 10, the cover is clamped lightly to the box and mortar can flow from one compartment to another only through the valves previously described. Suitable gaskets are provided between the cover and box. By this arrangement when hydraulic fluid is being pumped from drum 62 to drum 63, mortar is drawn from the hopper through valve 76, from compartment 69 to compartment 68 and thence into drum 62. At the same time, mortar in drum 63 is forced from compartment 70 through valve 80 to compartment 73 and coupling 67. The mechanism for pumping hydraulic fluid is not shown but may be the same as shown in the species of Figures 1 to 8, or in my copending application Serial Number 339,538, filed March 2, 1953.

In the previously described modification each drum is provided with a switch, such as 34 and 46 for drum 1. In the machine presently described, each drum is provided with two reversing switches functionally similar to those previously described but both switches are associated with the hydraulic side of the drums only, so that neither one ever comes into contact with or becomes fouled by plaster as it is drawn into and expelled from the plaster compartment. Thus, referring to Figure 9, drum half 63b has a switch assembly 35a comprising two switches 88 and 89 secured thereto with their actuating plungers adjacent the end of an operating lever 90 extending therebetween. The lever is pivotally mounted in and extends through the wall of the drum. Preferably the lever passes through or is fixed with a diaphragm or bellows device secured over an opening in the drum wall so that a pressure tight joint is provided while at the same time, the lever may pivot in opposite directions the short distance necessary to actuate each of the switch elements 88 and 89. As shown, the lever 90 has an offset or crank arm within the drum. That is, the lever extends a short distance axially after passing through the diaphragm, then has a substantially 90° bend radially, and finally a second 90° bend in the first direction. A pressure plate 90a which may be round flat item is secured centrally to the free end of the lever for contact with the main diaphragm 5 when the latter is fully distended by a charge of plaster from the hopper, to thereby actuate switch 89.

In order to actuate switch 88, when the corresponding drum is substantially exhausted of plaster, one or more light chains are attached to the diaphragm at their one end and to the end of arm 90 at the other. In the embodiment shown one chain is used and secured to any suitable reinforcement forming an integral part of the central portion of the diaphragm 5. The other end of the chain may be attached to pressure plate 90a. Alternatively three or more chains may be used each attached to the diaphragm on equally spaced intervals about the circumference of a circle of 2" radius centrally of the diaphragm.

In the modification being described, switch 89 corresponds with switch 35 of the model shown at Figure 3 and takes the place of switch 35 in the control circuit. Thus in an obvious manner, when drum 63 is substantially full of plaster, diaphragm 5, Figure 9, is distended until it exerts pressure upon plate 90a. The lever 90 is thus pivoted clockwise as viewed upon the figure, to close switch 89 and energize solenoid 44 of the hydraulic valve. On the other hand, switch 88 corresponds in function with switch 46 of the circuit previously described and shown upon Figure 5. Thus when drum 63 is substantially exhausted of plaster the chain shown in Figure 9, connecting diaphragm 5 with pressure plate 90a will become taut and the pull thereon will pivot lever 90 counterclockwise and close switch 88. It will be understood that the switch device 34a of drum 62 is identical with the one just described and has two switches corresponding in purpose and operation with switches 34 and 47 of the model first described.

The presently-described modification while functionally similar to the one previously described, has certain inherent advantages. Thus when one drum is being exhausted of oil, the pressure on the mortar side of the corresponding diaphragm is below atmospheric and a certain amount of air finds its way into the drum with the mortar. From Figure 9 which depicts the normal position of the parts in operation, it will be noted that the mortar outlet from each drum is at the highest point thereof. Consequently any air drawn into the drum on a suction stroke moves into position adjacent the outlet and is forced out of the drum first. This is a distinct advantage over a machine where any entrapped air may remain dispersed throughout the mortar and has to be greatly compressed to bring the combined mortar and air up to a pressure sufficient to impel the mortar to the applicator nozzle. Such entrapped air slows down the switch-over time between drums and also may result in inferior application. Where entrapped air is expelled first as with the present machine, the pressure build-up in the mortar is rapid and the flow is uniform after the air has been expelled.

Secondly, the present modification is very easy to clean, inspect and service. The importance of cleaning out unused mortar after each day's run is obvious. With my invention the entire machine can be tilted forwardly about pivots 64, Figure 11, until the drums and valve box are inclined forwardly and downwardly. The clamps 85 are then loosened and the hopper and valve cover are tilted back to about the dot-dash line position of Figure 9. The valves, valve chamber and mortar half of the drums are thereby exposed and can be easily, quickly and completely flushed out with a hose, after which the parts are returned to operating position ready for the next day's run. It is equally easy to service and replace valves. Furthermore the reversing switches are associated with the hydraulic fluid sides to the drums so that the operating parts thereof do not become fouled with plaster and the valve chamber is left free and unobstructed.

While I have shown two forms which the invention may take, various changes, modifications and substitutions will occur to those skilled in the art after a study of the foregoing specification. Consequently, I desire that the foregoing illustrations be taken in an illustrative and explanatory sense rather than a limiting sense. It is my desire and intention to reserve all modifications within the scope of the subjoined claims.

Having now fully disclosed the invention, what I claim and desire to secure by Letters Patent is:

1. In a plastering machine, a valve box having partitions dividing the same into first, second, third and fourth discrete chambers, there being valve openings in said partitions between said first chamber and said second and third chambers, there also being valve openings between said second and third chambers and said fourth chamber, valve means closing all said openings and enabling flow only from said first to said second and third chambers and from said second and third chambers to said fourth chamber, a plaster outlet connection in communication with said fourth chamber, a cover adapted to be removably sealed over said box in pressure tight relation with the edges thereof and with said partitions, there being an opening in said cover into said first chamber, and a hopper superposed over said cover in fixed relation therewith and in communication with said last-named opening.

2. A plastering machine as recited to claim 1, said cover being hinged to said box along one edge thereof, whereby said cover and hopper may be tilted to expose said chambers and valves, and clamp means operable to releasably secure said cover to said box in pressure tight relation with the edges thereof and with said partitions.

3. In a plastering machine, a valve box having partition means defining with the walls of said box, first, second, third and fourth chambers, a hopper above and in communication with said first chamber, an outlet opening from said fourth chamber, a pair of drums each comprising a container of fixed volume and a resilient diaphragm dividing the same into first and second compartments of reciprocally variable volume, means rigidly associating said drums and box to place said first compartments in communication with said second and third chambers, respectively, there being valve means in said partitions permitting flow from said first chamber to said second and third chambers only, and from said second and third chambers to said fourth chamber only, said drums lying in horizontally side-by-side relation, and means pivotally mounting said drums and box as a unit on a normally horizontal first axis whereby said drums may be tilted from position wherein the axes of said drums extend downwardly and away from said box, to a clean-out position wherein fluid will flow by gravity from all parts of said first compartments to said box.

4. A machine as recited in claim 3, a cover pivoted on said box, on a second normally horizontal axis parallel to said first axis, a hopper secured in superposed relation on said cover, said cover having an opening placing the base of said hopper in communication with said first compartment, and quickly releasable clamp means securing said cover to said box to make a pressure tight seal with the walls and partitions of said box.

References Cited in the file of this patent

UNITED STATES PATENTS

| 487,606 | Church | Dec. 6, 1892 |
| 1,559,666 | Bernier | Nov. 3, 1925 |
| 1,766,419 | Wertz | June 24, 1930 |
| 2,017,974 | Kastner | Oct. 22, 1935 |
| 2,552,763 | Baumann | May 15, 1951 |
| 2,667,129 | Graner | Jan. 26, 1954 |
| 2,669,189 | De Lancey | Feb. 16, 1954 |
| 2,673,525 | Lucas | Mar. 30, 1954 |

FOREIGN PATENTS

| 32,377 | Netherlands | Mar. 15, 1934 |